Patented July 28, 1942

2,291,396

UNITED STATES PATENT OFFICE 2,291,396

CONDENSATION PRODUCT

Eugene Lieber, West New Brighton, Staten Island, N. Y., assignor to Standard Oil Development Company, a corporation of Delaware No Drawing. Application February 10, 1940, Serial No. 318,329

3 Claims. (Cl. 252—51)

This invention relates to novel condensation products and to methods of preparing and using same, and more particularly, it relates to a novel method of making condensation products which have wax-modifying properties and which are especially suitable for use as pour depressors in mineral lubricating oils.

In the commercial preparation of ethylene diamine, there are formed as by-products the so-called polyalkylene polyamines, and it is one object of the present invention to convert these by-products, which heretofore have had relatively little value, into useful condensation products. Another object of the invention is to make wax modifiers by a new method not previously known to be capable of producing such substances. Another object of the invention is to provide a method of making wax modifiers particularly suitable for use as pour depressors in lubricating oils from the so-called higher fatty acids, which are available in large quantities at relatively low cost, as they may be derived readily from animal fat as well as from petroleum products such as paraffin wax, by oxidation of the latter.

Broadly, the invention comprises condensing polyalkylene polyamines with fatty acids, preferably the higher fatty acids having more than 10 carbon atoms. Examples of the polyalkylene polyamines which may be used include:

Diethylene triamine
    $H_2N—CH_2—CH_2—NH—CH_2—CH_2—NH_2$
Triethylene tetramine
    $H_2N—CH_2·CH_2—NH—CH_2·CH_2—$
                    $NH—CH_2·CH_2—NH_2$
Pentamethylene diamine
    $H_2N—CH_2—CH_2—CH_2—CH_2—NH_2$
Hexamethylene diamine
    $H_2N—CH_2—CH_2—CH_2—CH_2—CH_2—CH_2—NH_2$
Dipropylene triamine
    $H_2N—CH_2—CH_2—CH_2—NH—$
    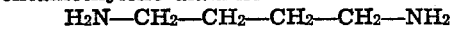
                    $CH_2—CH_2—CH_2—NH_2$
Di-sec.butylene triamine

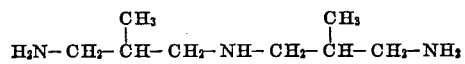

etc. Either single compounds or mixtures may be used. It is preferred to use polyalkylene polyamines having a molecular weight of at least 100 and preferably containing at least 3 nitrogen atoms.

As the fatty acids to be used, stearic acid is available in large quantities and in relatively pure form and is very suitable for the purposes of this invention. Also, other fatty acids e. g. margaric, palmitic, lauric, behenic etc. or fatty acids derived from animal or vegetable fats and oils may be used, such as from cottonseed oil, or mixtures of fatty acids obtained from such fats and oils. However, a preferred source of fatty acids is a product obtained by the oxidation of paraffin wax. The crude wax oxidation products contain a mixture of fatty acids ranging usually from about 12 carbon atoms to 24 carbon atoms, and may be readily separated into fractions having any desired average number of carbon atoms and consisting of broad or narrow range, as desired. For purposes of the present invention, a wax oxidation fatty acid cut having an average of about 18 carbon atoms and substantially free from fatty acids having less than 10 carbon atoms, has been found very suitable.

In carrying out the invention the amine and fatty acid reactants are mixed together, if desired in the presence of a solvent or diluent, and the mixture is preferably heated to a temperature between about 100° F. and 400° F., although usually a temperature of about 250° F.–350° F. is most suitable. During the condensation, volatile by-products of the reaction are produced, and to assist in their removal it is preferred to either pass a stream of inert gas, such as nitrogen, carbon dioxide, etc., through the reaction mixture, or to apply a partial vacuum, or to use both an inert gas stream and vacuum.

The course of the reaction can be judged in a general way by the increase in the viscosity of the reaction product, or alternatively by withdrawing from the reaction mixture from time to time small samples which can be tested for pour depressor potency. When the reaction is complete, any solvent or diluent which may have been used may be removed if desired and the condensation product itself, which is in most cases a brown wax-like solid soluble in mineral oils, may be either used as such, or treated in any suitable manner to remove undesirably low molecular weight or high molecular weight fractions of the condensation product.

The invention will be better understood from a consideration of the following experimental data.

A series of laboratory tests were made in which triethylene tetramine was condensed either with wax oxidation fatty acids or stearic acid in proportions ranging from 2 to 4 mols of the fatty acid to 1 mol of the triethylene tetramine, and the mixture heated to 300° F. for various lengths of time. The product in each case was tested for pour depressor potency by blending a small amount, such as 1, 2 or 5%, of the condensation product in a waxy oil, i. e. a Pennsylvania or paraffinic-type mineral lubricating oil, having a pour point of +30° F. In carrying out these tests, the fatty acid and amine were placed in a suitable reaction vessel fitted with a thermometer and an inlet tube for nitrogen gas, as well as an outlet for the volatile by-products and the inert gas. The temperature was slowly raised to 300° F., while passing a stream of nitrogen gas into the reaction mixture so as to maintain stirring and to remove the volatile by-products of the reaction. The reaction liquid was then maintained at 300° F. for the number of hours indicated and then allowed to cool to room temperature in the stream of nitrogen gas. No further purification was found necessary and the products were in all cases found to be freely soluble in mineral lubricating oil. The results of this series of tests are summarized in the following table:

Also, intra-molecular nitrile formation is possible. There is also a possibility that upon heating, the OH group of the fatty acid may combine with a hydrogen in the amine compound, for instance with the hydrogen in the NH group, with the resultant liberation of water vapor and the consequent formation of an acyl derivative of the polyalkylene polyamine and subsequent polymerization.

The product of this invention is a wax modifier, and as such has a number of uses. When used as a pour depressor in waxy mineral oils, by so modifying the properties of the wax in the oil that the resultant mixture has a substantially lower pour point than the plain waxy mineral oil, the wax modifier is used in a concentration of about 0.1% to 10%, preferably 0.5% to 5%. This wax modifier may also be used as a dewaxing aid, by adding small amounts thereof

Table I

| Test | Reagent | Grams | Triethylene tetramine, grams | °F. | Hours | Product Yield, grams | Pour point (°F.) of blends* containing percent shown | | |
|------|---------|-------|------|-----|-------|------|----|----|----|
| | | | | | | | 1 | 2 | 5 |
| 1 | Wax fatty acids | 284 | 73 | 300 | 4 | 325 | | −5 | −25 |
| 2 | ---do--- | 213 | 36.5 | 300 | 4 | 223 | | 0 | |
| 3 | ---do--- | 284 | 36.5 | 300 | 4 | 304 | | 0 | |
| 4 | ---do--- | 284 | 73 | 300 | 10 | 293 | | −15 | |
| 5 | Stearic acid | 284 | 73 | 300 | 4 | 327 | 0 | | |
| 6 | ---do--- | 284 | 73 | 300 | 12 | 293 | −10 | | |

*Original oil had pour point of +30° F.

This table indicates that a small amount e. g., 1, 2 and 5% of the reaction product of the triethylene tetramine and the fatty acids, effected a substantial reduction in the pour point of a waxy mineral lubricating oil, from +30° F. down to 0° F., and even as low as −25° F. The data also indicate that the best results from the point of view of pour depressor potency, are obtained by using 2 mols of the higher fatty acid to 1 mol of the triethylene tetramine and that better results are obtained with a reaction time of 10 hours than only 4 hours at 300° F. It is understood, of course, that with a higher temperature a shorter reaction time is usually satisfactory.

Although the mechanism of the operation of this invention is not well understood, it is believed that the following reactions occur:

(1) Salt formation:

$$H_2NCH_2CH_2NHCH_2CH_2NH_2 + R \cdot COOH \longrightarrow$$
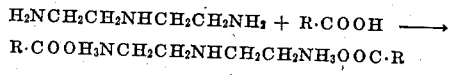

(2) Amide formation     | Heat (−H$_2$O)

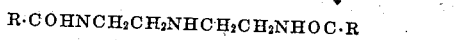

(3) Polymerization by intermolecular nitrile formation:    | Heat (−H$_2$O)
(e. g. from 2 mols of above)

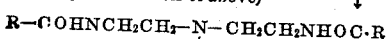
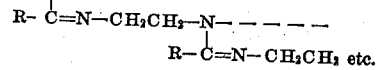

(e. g. 0.1 to 10%) to a solution of a waxy mineral oil dissolved in a substantial amount of solvent or diluent. This wax modifier may also be used in small amounts such as about 0.5% to 10% as an addition agent to paraffin wax, or other normally hard, brittle wax, to modify the properties thereof.

It is not intended that this invention be limited to any theory advanced as to the mechanism of the operation of the invention, nor to any of the specific examples which have been given merely for the sake of illustration.

I claim:

1. A composition comprising a wax-containing oil and a small amount of a condensation product of a polyalkyl polyamine and a fatty acid.

2. A composition comprising a waxy mineral lubricating oil having added thereto a small amount of a substance having pour depressor properties and comprising essentially a condensation product of a polyalkylene polyamine and a fatty acid.

3. A lubricating composition comprising a major proportion of a waxy mineral lubricating oil and a pour depressing amount of a condensation product of triethylene tetramine and a substantially saturated fatty acid having more than 10 carbon atoms.

EUGENE LIEBER.